United States Patent
McDonald et al.

(10) Patent No.: US 7,178,526 B2
(45) Date of Patent: *Feb. 20, 2007

(54) QUICK-DONNING FULL FACE OXYGEN MASK WITH INFLATABLE HARNESS AND SOFT FOLDABLE LENS

(75) Inventors: Thomas K. McDonald, Overland Park, KS (US); Gary R. Hannah, Merriam, KS (US); Randy G. Stratman, Prairie Village, KS (US); Gregory R. Jones, Lenexa, KS (US)

(73) Assignee: BE Intellectual Property, Inc., Wellington, IL (US)

(*) Notice: Subject to any disclaimer, the term of this patent is extended or adjusted under 35 U.S.C. 154(b) by 95 days.

This patent is subject to a terminal disclaimer.

(21) Appl. No.: 10/671,379

(22) Filed: Sep. 25, 2003

(65) Prior Publication Data

US 2004/0060562 A1    Apr. 1, 2004

Related U.S. Application Data

(60) Continuation of application No. 10/214,033, filed on Aug. 7, 2002, now Pat. No. 6,672,307, which is a continuation of application No. 09/560,011, filed on Apr. 27, 2000, now Pat. No. 6,443,155, which is a continuation of application No. 09/362,264, filed on Jul. 28, 1999, now Pat. No. 6,070,580, which is a continuation of application No. 08/820,079, filed on Mar. 19, 1997, now Pat. No. 5,957,132, which is a division of application No. 08/316,422, filed on Sep. 30, 1994, now Pat. No. 5,664,566.

(51) Int. Cl.
  *A62B 18/08*    (2006.01)
(52) U.S. Cl. ..................... 128/207.11; 2/4.7

(58) Field of Classification Search ........... 128/201.12, 128/201.14, 201.15, 201.22, 201.23, 201.24, 128/201.27, 205.25, 206.12, 206.23, 206.24, 128/206.26, 206.27, 206.28, 207.11, 201.17, 128/201.25, 206.16, 206.17, 206.21; 2/4.1, 2/4.2, 4.3, 4.7, 15, 426, 424, 447, 450, 459
See application file for complete search history.

(56) References Cited

U.S. PATENT DOCUMENTS 1,203,079 A    10/1916    Antwerp (Continued)

FOREIGN PATENT DOCUMENTS

EP    A 0 419 751    4/1991

(Continued)

OTHER PUBLICATIONS

MCU-2/P *Chemical and Biological Protective Masks*, Scott P/N 864-Series, Scott Aviation, A Figgie International Company, Lancaster, New York.

(Continued)

*Primary Examiner*—Henry Bennett
(74) *Attorney, Agent, or Firm*—Fulwider Patton LLP

(57) ABSTRACT

A mask and harness system for use in providing breathing oxygen and protection from pollutants for the eyes and respiratory system includes a face seal, a soft flexible lens, a pneumatically-actuated harness, and a regulator with microphone to control the flow of oxygen and to facilitate communications in aircraft flight decks and other aircraft compartments.

13 Claims, 6 Drawing Sheets

U.S. PATENT DOCUMENTS

| | | | |
|---|---|---|---|
| 2,056,753 A | 10/1936 | Wagner | |
| 2,108,256 A * | 2/1938 | Dym | 128/201.15 |
| 2,365,779 A | 12/1944 | Schwab | |
| 3,004,535 A * | 10/1961 | Nielson | 128/201.12 |
| 3,293,659 A | 12/1966 | Shepard | |
| 3,599,636 A | 8/1971 | Gutman | |
| 3,762,407 A | 10/1973 | Shonerd | |
| 3,792,702 A | 2/1974 | Delest | |
| 3,898,427 A | 8/1975 | Levin et al. | |
| 4,157,090 A | 6/1979 | Phillips | |
| 4,221,216 A | 9/1980 | Kranz | |
| 4,233,970 A | 11/1980 | Kranz | |
| 4,437,462 A | 3/1984 | Piljay et al. | |
| 4,502,480 A | 3/1985 | Yamamoto | |
| 4,534,344 A | 8/1985 | Constance-Hughes | |
| 4,595,003 A | 6/1986 | Shoemaker et al. | |
| 4,625,721 A | 12/1986 | Levine et al. | |
| 4,676,236 A | 6/1987 | Piorkowski | |
| 4,736,740 A | 4/1988 | Parker et al. | |
| 4,800,123 A * | 1/1989 | Boeckeler | 428/424.2 |
| D304,384 S | 10/1989 | Derobert | |
| 4,870,959 A | 10/1989 | Reisman et al. | |
| 4,901,356 A | 2/1990 | Bauer | |
| 4,915,106 A * | 4/1990 | Aulgur et al. | 128/207.11 |
| 4,926,853 A * | 5/1990 | Meunier | 128/201.18 |
| H0805 H | 8/1990 | Schriver et al. | |
| H883 H * | 2/1991 | Little et al. | 128/201.17 |
| 5,036,846 A | 8/1991 | Aulgur et al. | |
| 5,040,530 A | 8/1991 | Bauer et al. | |
| H1023 H | 3/1992 | Wiseman, Sr. | |
| 5,113,854 A | 5/1992 | Dosch et al. | |
| 5,115,804 A | 5/1992 | Brookman | |
| 5,140,980 A | 8/1992 | Haughey et al. | |
| 5,186,165 A | 2/1993 | Swann | |
| 5,199,421 A | 4/1993 | Figgiani et al. | |
| 5,269,296 A * | 12/1993 | Landis | 128/207.18 |
| 5,307,793 A | 5/1994 | Sinclair et al. | |
| 5,318,018 A | 6/1994 | Puma et al. | |
| H1360 H | 10/1994 | Grove et al. | |
| 5,371,804 A | 12/1994 | Bauer | |
| 5,492,116 A | 2/1996 | Scarberry et al. | |
| 5,630,412 A | 5/1997 | Dubruille et al. | |
| 5,655,527 A | 8/1997 | Scarberry et al. | |
| 5,664,566 A | 9/1997 | McDonald et al. | |
| 5,819,728 A | 10/1998 | Ritchie | |
| 5,880,171 A * | 3/1999 | Lim et al. | 523/106 |
| 5,941,245 A * | 8/1999 | Hannah et al. | 128/207.11 |
| 5,954,052 A * | 9/1999 | McDonald et al. | 128/206.27 |
| 5,957,132 A | 9/1999 | McDonald et al. | |
| 6,039,045 A * | 3/2000 | Bertheau et al. | 128/207.11 |
| 6,070,580 A * | 6/2000 | McDonald et al. | 128/207.11 |
| 6,302,103 B1 * | 10/2001 | Resnick | 128/201.23 |
| 6,443,155 B1 * | 9/2002 | McDonald et al. | 128/207.11 |
| 6,672,307 B2 * | 1/2004 | McDonald et al. | 128/207.11 |

FOREIGN PATENT DOCUMENTS

| | | |
|---|---|---|
| EP | 0 464 342 A2 | 1/1992 |
| FR | A 2 649 016 | 1/1991 |
| IL | EP 0 419 751 A1 | 9/1989 |
| WO | WO A 89 07961 | 9/1989 |

OTHER PUBLICATIONS

*The Optical Properties of Smoke-Protective Devices*, John A. Vaughan, Kenneth W. Welsh, Paul G. Rasmussen, Civil Aeromedical Institute, Federal Aviation Administration, Oklahoma City, Oklahoma, Oct. 1978.

*The MAGIC Mask*, Scott Aviation, A Figgie International Company, Lancaster, New York.

Declaration of Michel G. J. C. Bardel, Jul. 12, 2001.

Preliminary Data Sheet SE6800-D2 "Clear" Peroxide Cured Molding Grade.

Preliminary Data Sheet 454-3243 Ultra Tufel "Water Clear, Fast Cure" Molding Grade.

Eros MAGIC Quick-Donning Mask, Scott Aviation, 1989.

* cited by examiner

QUICK-DONNING FULL FACE OXYGEN MASK WITH INFLATABLE HARNESS AND SOFT FOLDABLE LENS

RELATED APPLICATIONS

This is a continuation of Ser. No. 10/214,033 filed Aug. 7, 2002, now U.S. Pat. No. 6,672,307 B2, which is a continuation of Ser. No. 09/560,011 filed Apr. 27, 2000, now U.S. Pat. No. 6,443,155, which is a continuation of Ser. No. 09/362,264 filed Jul. 28, 1999 now U.S. Pat. No. 6,070,580, which is a continuation of Ser. No. 08/820,079 filed Mar. 19, 1997 now U.S. Pat. No. 5,957,132, which was a divisional of Ser. No. 08/316,422 filed Sep. 30, 1994, now U.S. Pat. No. 5,664,566.

BACKGROUND OF THE INVENTION

1. Field of the Invention

This invention relates to face mask system for protection from atmospheric pollutants and the supply of oxygen to the mask wearer and more particularly to mask system to supply oxygen for use in oxygen-depleted environments during aircraft decompression, smoke from onboard fires, airborne debris or other toxic gases which may enter the aircraft flight deck or other crew compartments.

2. Description of Related Art

In the course of aircraft operation, various personnel, including but not limited to pilots, navigation officers, and other flight crew personnel, may need a mask system to provide breathing oxygen and also to provide protection from smoke from onboard fires and other possible airborne eye and lung irritants which may enter the crew compartment(s). There is a requirement in the commercial aviation industry that the masks designed for crew usage be capable of donning in five seconds or less, be able to be donned over eyeglasses and be capable of supplying oxygen consistent with physiological demands at altitudes up to 40,000 feet.

Provisions for stowage of the mask must be sensitive to both the quick-donning requirements and the very limited space and volume available in the aircraft flight decks, and it is particularly desirable that mask storage be compact enough that it is easily placeable within the flight deck in a position close to and convenient to the crewmember when he or she is seated at his or her station. It is also highly desirable that the mask be capable of accommodating a wide variety of facial sizes and configurations while still adequately sealing the face from the external environment.

Since the mask is to be used by crewmembers in an environment that may be highly stressful, both in terms of the visual tasks and the visibility afforded in the presence of smoke and the like, it is important that the mask provide an acceptable level of optical clarity and freedom from distortion consistent with the other desirable characteristics of the mask. Another desirable characteristic is that the mask provide, to the extent possible for a stowable mask, protection from impingement on the face of airborne debris and pollutants, and protection of the eyes in particular from the windborne type of debris that could be present from an explosive decompression or other breach of the windshield system in a large aircraft. Prior art crew masks have addressed these problems with masks incorporating rigid lenses mounted in an otherwise flexible mask, or by combinations of goggles and oxygen masks. While these masks have been functionally useful, they offer disadvantages in field of view, adaptability to a wide range of head sizes and configurations, the ability to be rapidly donned over glasses and stowability in small areas in the cockpit of the aircraft near the crewmember. The present invention provides improved solutions to all of these problems.

SUMMARY OF THE INVENTION

The present invention is for a stowable mask that meets a number of stringent and difficult environmental and functional requirements for use in circumstances that typically exist in a pressurized aircraft after decompression or in the event of an in-flight emergency that causes smoke or debris to intrude into the flight deck. In the event that such an event occurs, it is recognized that the continued ability of the flight crew to operate with a high degree of competence is critical to the prevention of loss of life and property, and thus the availability of such masks and their functionality is highly desirable for such aircraft.

Because of the recognition of the benefits of such mask systems, it has also become common to require the availability of such masks to many who may during the course of their occupations be exposed to such hazards and who must perform critical tasks during such exposure. Particularly in the case of aircraft, it is highly desirable that such masks take up the smallest amount of stowage space prior to use in order to make them available to the seated user at his station and to avoid taking up the limited space in the flight deck. Thus, the instrument panel or side panels at the crew station are preferred locations for this equipment. It is important that the mask be stowed in a manner which allows for the quick-donning and also does not interfere with normal aircraft operation. As the mask is likely to be installed on both existing, as well as new aircraft, it is an important feature of the invention that the mask fit in existing cavities already defined for such equipment.

The present invention provides a mask assembly which meets the requirements of quick-donning for the wearer who may be faced with hazardous flight conditions. The invention has the further benefit of improved quick donning capability over eyewear, such as glasses, being worn by the user. Since it is often the case that an inflight emergency is followed by a fairly long period during which the crewmembers must operate in the hazardous environment and guide the aircraft to a safe landing, the mask of the present invention is also configured to be comfortable when worn for extended periods of time. Such a feature is particularly important in light of certain regulations of some aviation regulatory bodies which require that the mask be worn by one crewmember at all times. There are also requirements by some regulatory bodies for usage of the mask when a crewmember exits the flight deck. Other extended operations scenarios may call for wearing the mask for three hours or more and thus comfort of wear is highly desirable.

It is weal recognized that the primary purpose of the invention is to limit infiltration of pollutants and provide adequate physiological oxygen volumes for the hazardous environment resulting from either aircraft decompression or hazardous gases, not limited to smoke, which may enter the crew compartment(s).

In a presently preferred embodiment, a feature of the invention is the ability to provide an emergency breathing device in which the flow of oxygen is adjustable according to physiological requirements. Whether this feature is a requirement is determined by the regulatory bodies having jurisdiction over the regions in which the aircraft operates. It is also important that the mask, once donned, leaves both hands of the wearer free to perform his duties and that the mask provide the necessary field of view to perform those functions. Accordingly, the invention is designed to not only provide a wide field of view, but also provide vented oxygen to purge the volume around the eyes and to prevent condensation on the lens interior surfaces. Since part of the crew's functions will inevitably include communication with other crewmembers and ground controllers, the invention can also provide an integrated microphone enabling continued communications between aircraft crew and ground stations once the mask is worn.

In order to provide the above benefits, the present invention utilizes a flexible lens instead of the rigid or semi-rigid lens of prior art emergency crew masks, which, when combined with a flexible material utilized in the balance of the mask, allows the mask to be rolled up into a relatively small package for stowage on a flight deck. It has been found that the flexible lens of the present system, when combined with the flexible face seal of the mask, provides improved benefits in the ability to accommodate a wide variety of face and head sizes. The invention also includes, in combination with the flexible lens and flexible face seal, an inflatable harness, the inflation being provided and controlled by an oxygen regulator which also provides breathing oxygen to the wearer. A portion of the oxygen for consumption by the wearer may also be distributed around the wearer's eyes in order to purge and clear the lens in conditions conducive to fogging and eye irritation.

In a presently preferred embodiment, the invention includes a flexible elastomeric lens that is molded into a flexible face seal surrounding the lens. The face seal includes mounting points for an inflatable harness extending from the mask around the back of the wearer's head. In this embodiment, the inflatable harness is made of flexible elastomeric tubing surrounded by a flame resistant covering of Nomex® or the like and includes connectors between the inflatable tubing and the mask to keep the desired form and shape of the harness when inflated. The connectors can include adjustable straps to vary the size of the harness to fit a variety of head sizes. The mask seal is molded to receive a regulator which supplies oxygen or breathing gas to the wearer and also supplies gas to the inflatable harness by a suitable passage. The mask can also include passages from the regulator to the interior of the lens to purge and clear the interior of the lens during wear. The mask assembly may also be made by molding the entire mask of a flexible optically transparent silicone or other suitable plastic which can maintain optical quality in the lens region and has the other features described above. The lens area of either embodiment may be coated with an abrasion resistant material such as urethane to prevent damage to the lens prior to and during use. In either construction, a microphone can also be incorporated into the mask to allow continued conversation between the crewmember and the electronic communication system in the aircraft. Similarly, provisions can be made in the mask to accommodate headsets or earpieces for the crewmember, if required.

From the above it will be seen that the invention provides an improved mask for use by aircraft flight crews during the event of a depressurization or smoke in the cockpit, and also improves the comfort level, visibility and storability of the mask, as well as offering high performance with regard to isolation of the wearer from the hostile environment. Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

As shown in the exemplary drawings, a first presently preferred embodiment of the present invention is embodied in a flexible, full face coverage mask for use by aircraft flight crews which includes a flexible lens sealingly molded in to the face seal. The mask also incorporates an inflatable harness which is inflated by the breathing oxygen regulated by a regulator incorporated into the face mask. The mask also provides for purging of the interior of the flexible lens by gas from the regulator in order to retard fogging and other obscuration of the view out of the lens by the wearer. The entire assembly is capable of being rolled up into a relatively small package, which facilitates its installation within the limited available space readily at hand to the seated crewmember on the flight deck. In a second presently preferred embodiment, the entire flexible mask portion, including the lens, can be formed of a single unit, either through use of an insert molded into the balance of the mask or by use of an elastomeric transparent material for the entire face mask portion of the assembly.

Figure 1:
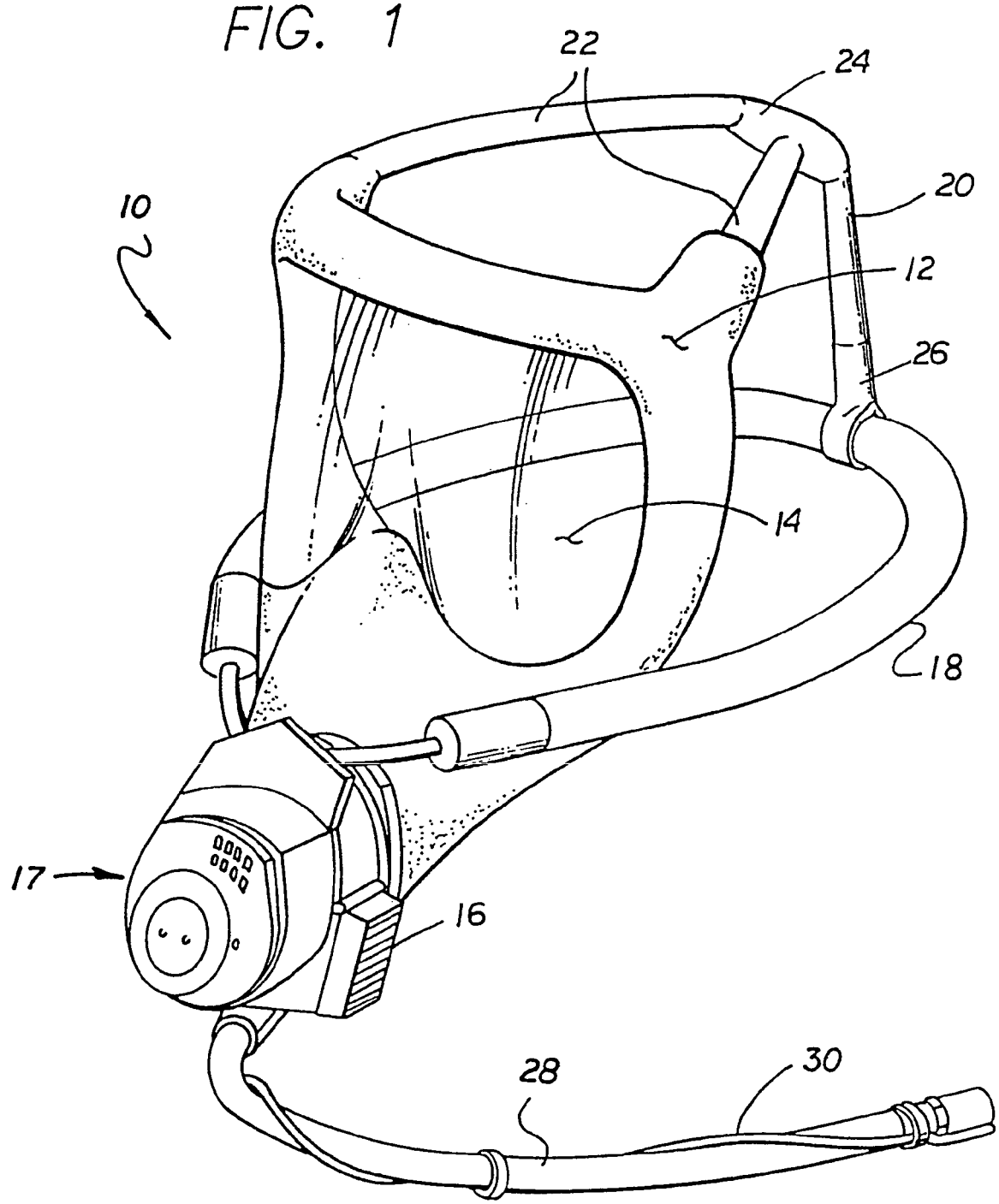
FIG. 1 is a perspective view of the crew mask of the present invention, illustrating the general arrangement of the components.

FIG. 1 illustrates a general arrangement of a first preferred embodiment of the present invention. The mask assembly 10 includes a face seal molding 12 formed to fit around the periphery of the face of the wearer and receive a flexible lens 14 which is bonded or inserted into the elastomeric face seal 12. The lower forward portion of the face seal 12 incorporates a portion which includes an oxygen supply regulator assembly 16 removably attached to the lower forward portion of the mask. The regulator 16 supplies breathing oxygen to the mask wearer through ports internal to the lower forward portion of the face seal 12, and also supplies oxygen or other breathing gas mixtures to an inflatable harness 18 connected to the breathing gas regulator and the face seal 12 via suitable gas passages and connectors in the mask.

Connecting straps 20 and 22 are then similarly connected at their extremities to a connector 24 which may also be adjustable to provide means to adjust for the size and comfort of the mask once inflated. A further connector 26 connects strap 20 to the inflatable portion 18 of the harness assembly.

In a presently preferred embodiment, a clear flexible elastomeric lens 14 is either bonded or inserted into a receptacle in the elastomeric face seal 12. The use of the flexible lens in concert with the elastomeric face seal of the invention serves to improve the ability of the mask to seal out toxic or vision impairing gases. These improved face sealing characteristics also improve the oxygen consumption performance of the mask, as there is less leakage over a wider variety of face configurations. The oxygen supply for the mask is provided by oxygen supply tube 28 connected to regulator 16. In order to facilitate communication, the mask may also incorporate a microphone (not shown) which is connected to the aircraft communication system by electrical wiring 30, which may be concurrently routed with oxygen supply tube 28.

Figure 3:
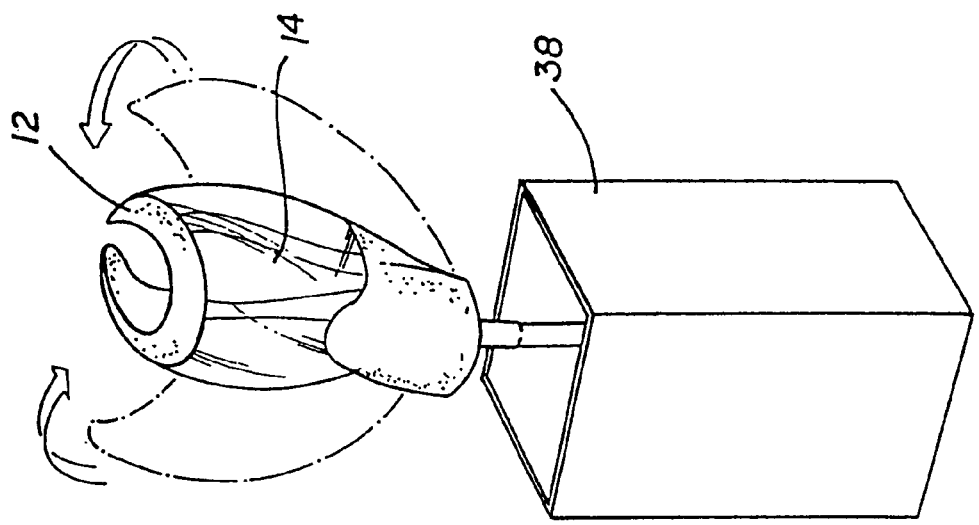
FIG. 3 is a perspective view of the mask of the present invention illustrating the stowage volume for the mask of the invention.
Figure 2:
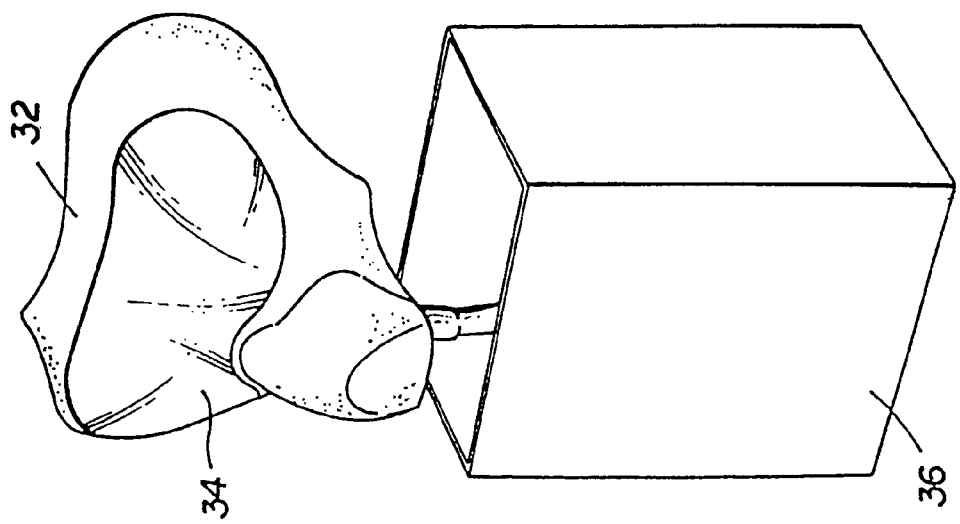
FIG. 2 is an illustration of the prior art mask and the associated stowage volume for such a mask.

Certain benefits of the present invention may be better understood by reference to FIGS. 2 and 3, which illustrate the difference in size and configuration of the present invention as compared to prior art aircraft emergency crew masks incorporating rigid lens assemblies. As illustrated in the prior art, FIG. 2, a mask 32 incorporating a rigid lens assembly 34 of necessity requires a fairly large enclosure 36 into which the mask must fit to account for the inflexibility of the lens, regardless of the flexibility of the balance of the mask assembly. In contrast, by use of the flexible lens, flexible face seal and inflatable harness of the present invention, as illustrated in FIG. 3, the mask may be rolled so that lens 14 and face seal 12 consume a substantially smaller volume 38 as compared to prior art masks. This feature of the invention allows the mask to be mounted in a considerably smaller space within the aircraft and possibly be placed more conveniently to hand of the crewmember during times of emergency. In light of the increased complexity and sophistication of modern aircraft, and the use of fewer crewmembers compared to previous equally complex aircraft, flight deck volume has been in short supply and thus the smaller envelope of the stowed mask of the present invention represents a substantial advantage over prior art emergency crew masks.

Figure 5:
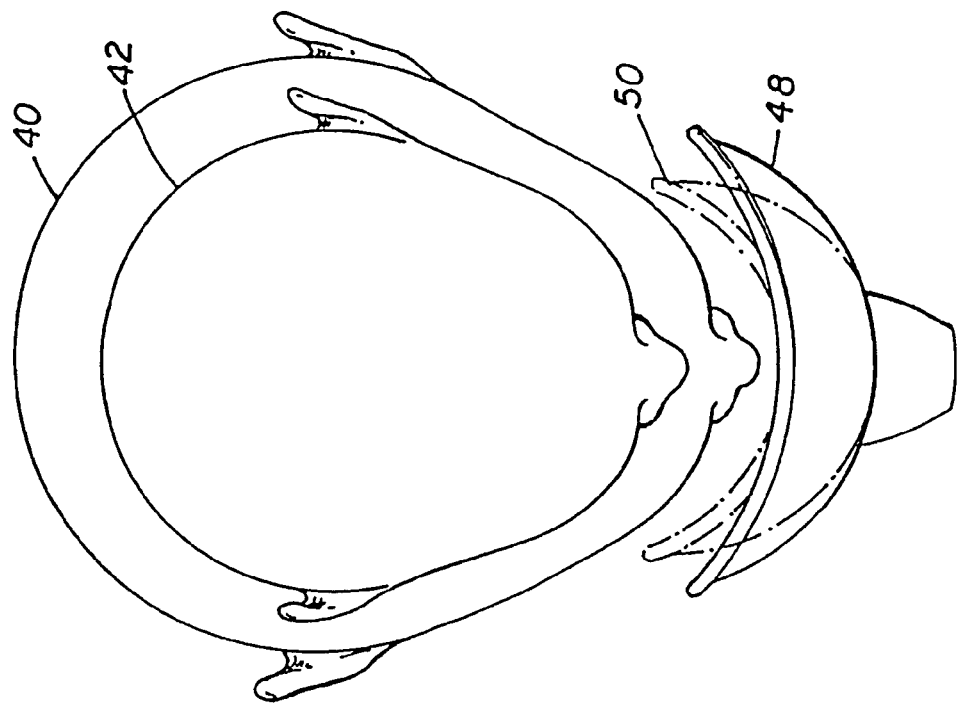
FIG. 5 is a vertical view of the present invention mask illustrating the ability of the mask to accommodate to the appropriate range of head sizes.
Figure 4:
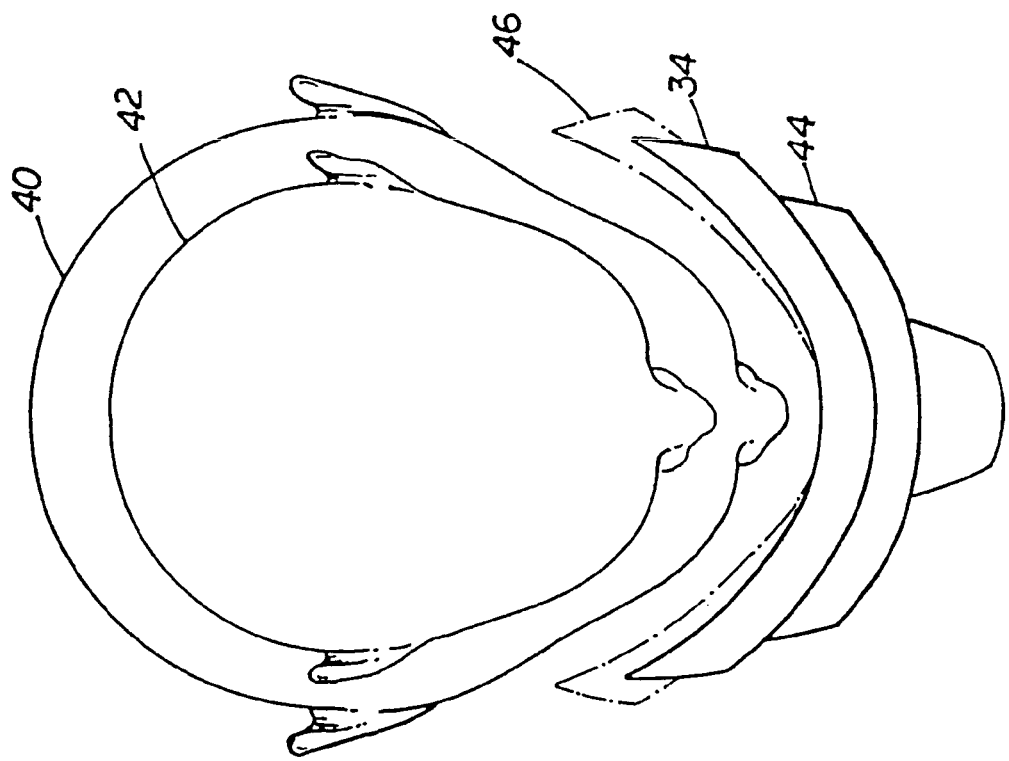
FIG. 4 is a vertical view of the prior art masks and their relationship to the range of head sizes to be accommodated by the mask.

Referring to FIGS. 4 and 5, FIG. 4 illustrates how the present invention readily adapts to faces of various sizes more easily than prior art masks. More specifically, referring to FIG. 4, which illustrates both large 40 and small 42 heads which may be required to be accommodated by emergency flight crew masks assemblies, it may be seen that a conventional rigid mask lens assembly 34 incorporated into conventional mask face seal 44 cannot accommodate this range of head sizes without highly compliant seals provided at the edges of the lens and at the edges of the face seal. Comparing the flexibility of the present lens assembly and the face seal illustrated in phantom as 46 shows the relatively small amount of flexibility available in a prior art lens assembly to accommodate the range of head sizes desired. Referring to Fig. 5, it may be seen that the same head sizes 40 and 42 may be more readily accommodated by the present invention. More specifically, it can be seen that the flexible integrated mask and lens assembly 48 can deflect over a substantially greater range as illustrated in phantom by dotted lines 50 to more easily accommodate the required range of head sizes. Furthermore, such accommodation is accomplished without the requirements for high compliance seals at the edges of the lens assembly in order to bridge the difference in rigidity between a rigid lens and a soft face seal, and the stresses on the seal between the lens and the face seal are substantially reduced by the increased flexibility of the lens of the present invention. Because of the lens flexibility in the present invention, the entire face seal can then flex more to varying head and face sizes. Another benefit of the present invention is that since the soft lens is intentionally flexed with the face seal by the combination to the face of the user in response to the inflatable harness, less face seal frame structure is needed than in hard lens designs which must include an adequate structure to support the rigid lens.

Figure 6:
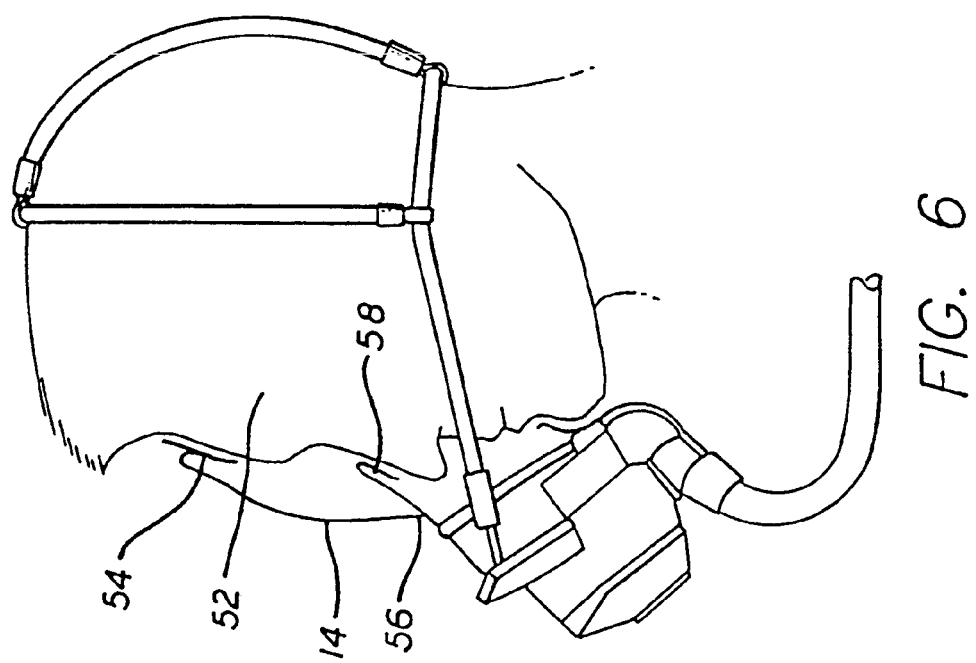
FIG. 6 is a side view of the mask of the present invention illustrating the sealing portions of the mask and their relationship to the lens in the face of the wearer.
Figure 8:
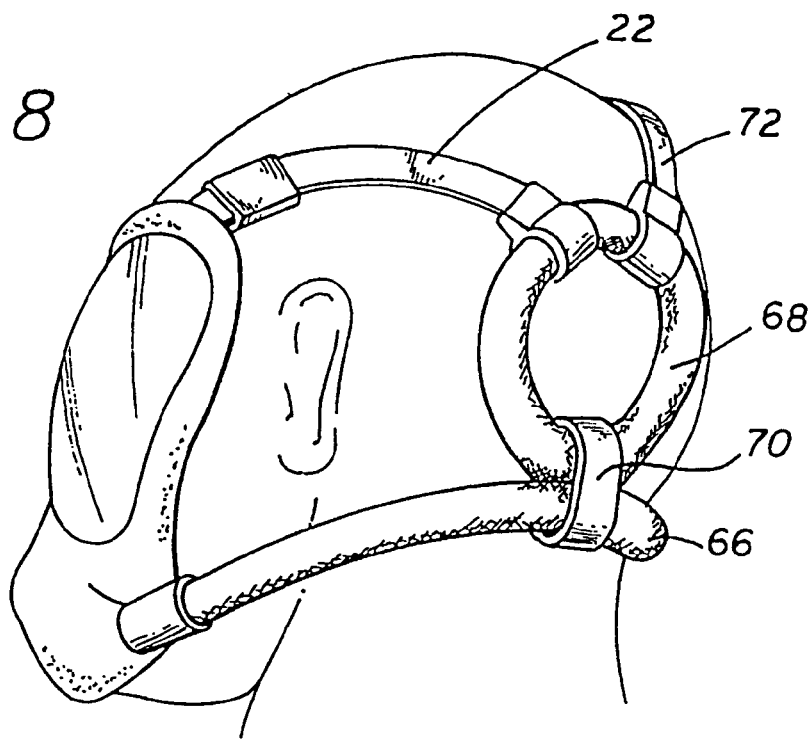
FIG. 8 is a perspective view of a first embodiment of the inflatable mask harness.

FIG. 6 is a cross sectional view of the flexible mask and lens assembly of the present invention, illustrating the ease with which the mask both accommodates to the face of the user and provides a seal with the user's face. Referring to FIG. 6, which illustrates a cross sectional view of the mask assembly of the present invention on the face of the user, it can be seen that the flexible face seal portion 12 conforms closely with the face of the wearer 52, thereby providing an excellent seal for the mask for a variety of face configurations and surfaces. Flexible lens 14 is sealingly attached to face seal 12 at positions 54, 56, allowing face seal 12 to conform closely to the wearer's face by deflecting to accommodate any of a variety of facial configurations. A nose bridge seal portion 58 is molded into the face seal 12 in order to provide a particularly compliant configuration for sealing across the nose bridge of the wearer.

Figure 7:
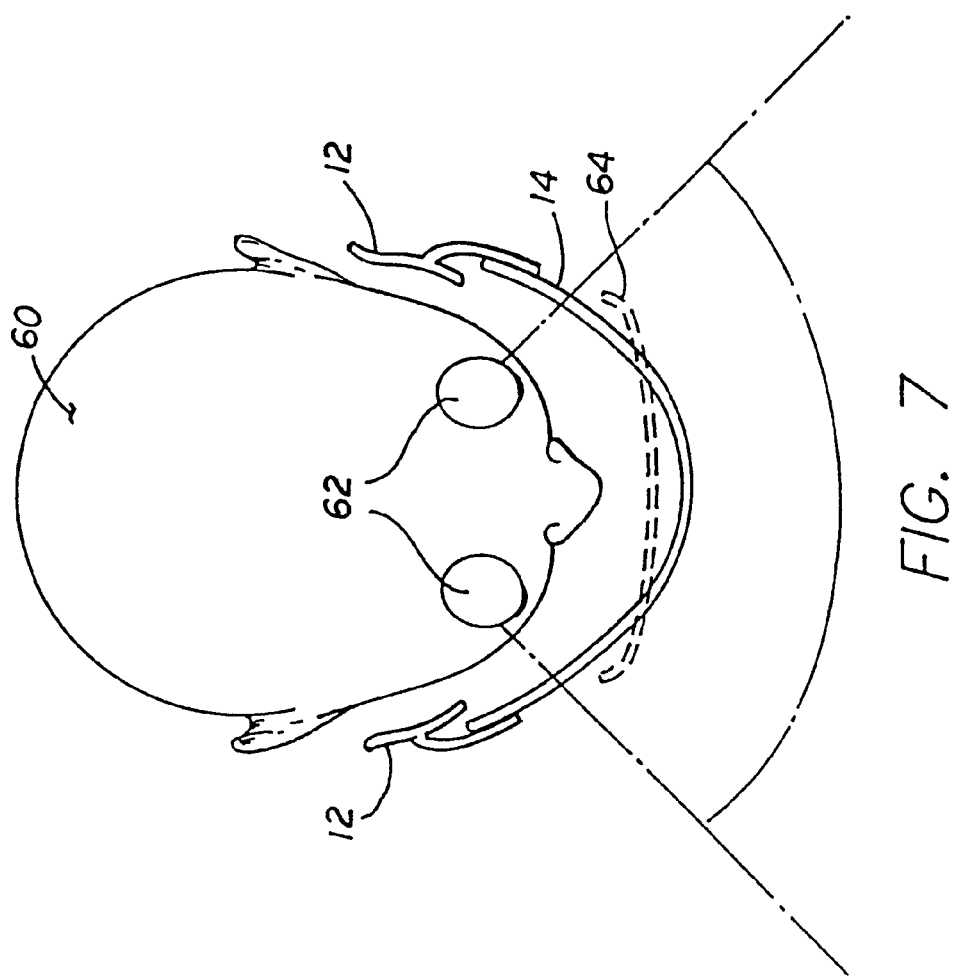
FIG. 7 is a vertical view of the mask illustrating the field of view of the eyes of the wearer and the accommodation of the field of view by the present invention and prior art lenses.

FIG. 7 is an illustration of a vertical aspect illustrating the field of view of a wearer, and showing the superior accommodation of fields of view of a wearer by the present invention. The wearer 60, whose eyeballs 62 are capable of a field of view θ is ordinarily limited by the field of view of a rigid lens of the type utilized in the prior art 64. Such a rigid or semi-rigid lens, while providing good optical quality, does not allow for a broad field of view and this may have certain important limitations, particularly in the event of emergency circumstances for a flight crew in an aircraft. By contrast, the present invention lens 14 is capable of deflection over a far wider region of the wearer's face while maintaining acceptable optical quality, thus allowing for a full view through the optical portion of the mask of the field of view θ of the user's eyes 62. This wide field of view is further enhanced by the ability to provide a closely fitting mask on the side portions of the face by use of the flexible lens 14 and flexible face seal 12 which can conform tightly with the forward side portions of the wearer's face.

Figure 9:
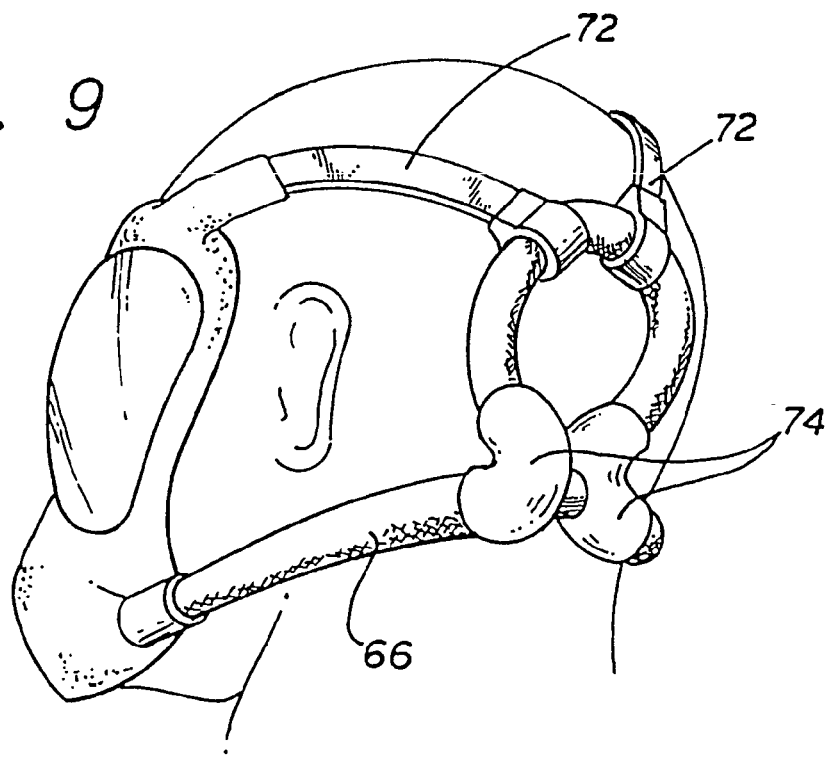
FIG. 9 is a rear perspective view of a second embodiment of the inflatable mask of the invention.
Figure 10:
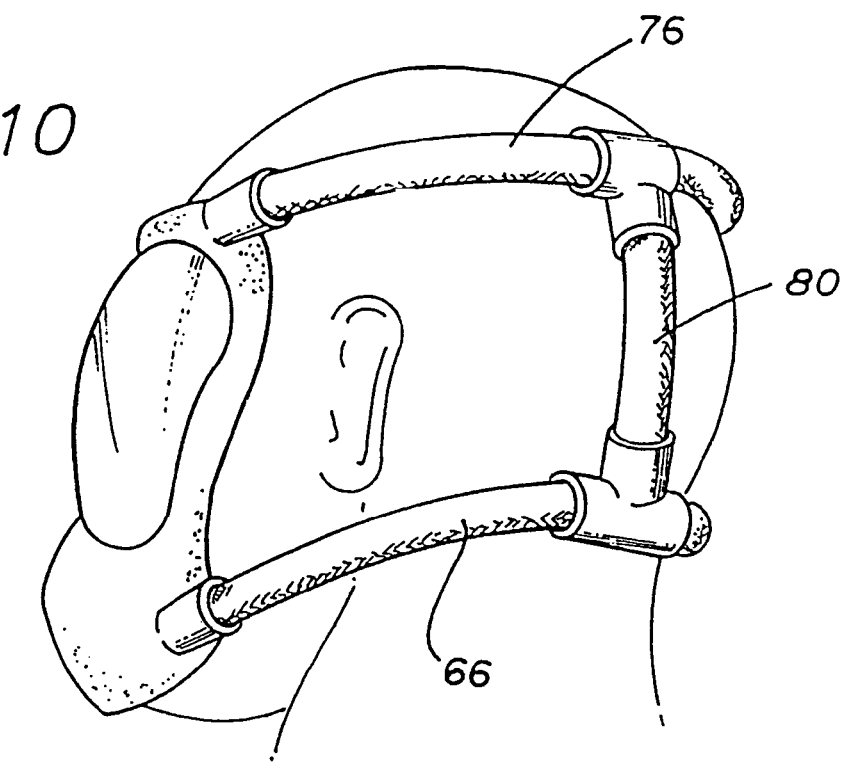
FIG. 10 is a rear perspective view of a third embodiment of the inflatable harness of the present invention.
Figure 11:
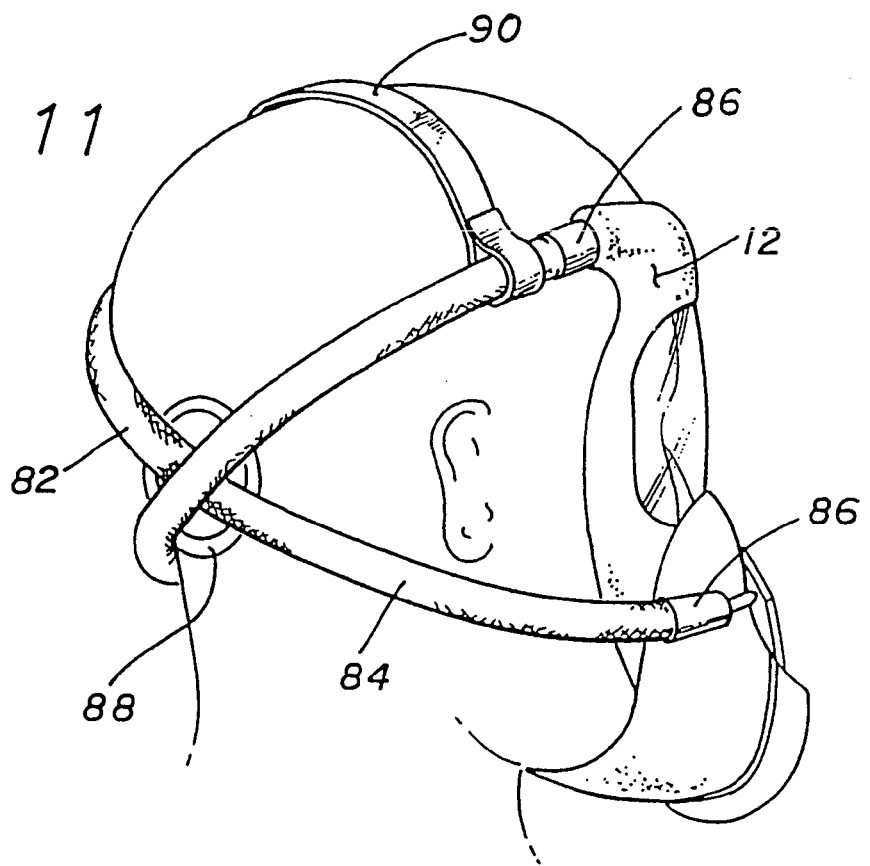
FIG. 11 is a rear perspective view of a fourth embodiment of the inflatable harness of the present invention.

FIGS. 8 through 11 illustrate a variety of configurations which may be used for the inflatable harness in order to provide close fitting and comfort for the wearer of the mask of the present invention. The inflatable portion of FIG. 8 includes both a lateral wrap-around elastomeric tube 66 and a central circular elastomeric tube 68 which are connected to one another by a harness connection 70 and into the mask by adjustable straps 72. A similar configuration is illustrated in FIG. 9, in which a single inflatable tube 66 is configured to assume a similar shape to that of FIG. 8 by connectors 74, thereby gaining the benefit of a single continuous tube to be used for the inflatable harness assembly. Similarly to FIG. 8 the inflatable portion of the harness is then attached to the face seal by straps 72. FIG. 10 illustrates a further variation in which the inflatable assembly consists of both a top and bottom lateral tube 66, 76 connected by a vertical tube 80, all of which are supplied with air via the regulator in the forward portion of the mask. FIG. 11 illustrates yet another configuration for the harness which may be advantageously used with the invention. In this embodiment elastomeric tubes 82, 84 are attached to mask face seal 12 by connectors 86 and are held in place in the crossed position behind the wearer's head by retainer 88. A strap 90 also serves to preserve the shape of the harness during use.

It is important that the lens of the present system have sufficient optical quality and resistance to abrasion and other damage to function similarly to the rigid and semi-rigid lenses of prior art masks. It is well known that a number of formulations of silicone exist that provide resistances to yellowing and other optical degradation sufficient for use in a mask which must be stored for long periods of time prior to use. One such material which should be suitable for this purpose as a lens material is General Electric SE6800-D2 silicone in the "clear" peroxide cured molding grade. Other clear, flexible plastic materials with optical transmittance in the 80% range may also be suitable, depending on the detail design of the mask. There are also scratch resistant additives and coatings that are available for silicone formulations which enhance the ability of the lens to maintain optical quality when subject to abrasion. One such scratch resistant coating involves the coating of the lens with urethane. In a presently preferred embodiment, the invention involves the use of a urethane coated silicone lens bonded to the silicone based face seal by use of the following process. The lens is premolded out of silicone and coated with an abrasion resistive coating, such as urethane. The lens is then placed in a mold which is designed to receive the lens and mold the liquid mask material around the lens and other inserts, if any, such as the harness mounting hardware and regulator mounting assembly. The lens perimeter and mask seal is cleaned with Methyl Ethyl Ketone and the lens with Hexane. An adhesive such as 34D manufactured by Synthetic Surfaces, Scotch Plains, N.J. is then used to adhere the lens to the face seal. The mask is then cured, depending upon the requirements of the particular silicone, and the completed mask is removed from the mold.

An important aspect of the invention is the ability to combine the flexibility of the mask seal and lens with the inflatable harness in order to provide previously unavailable levels of lens field of view, storability, comfort, wearability and sealing in a mask that is also providing sufficient optical quality for use under high stress conditions by flight crews. While a variety of regulators may be used, in a presently preferred embodiment, one regulator suitable for use with the mask is the Puritan-Bennett oxygen pressure regulator previously utilized in the Puritan-Bennett Sweep On 2000 Crew Mask, available without a lens but with an inflatable harness made of silicone tubing overlaid with Nomex® braided material. This demand regulator also provide the ability to adjust the pressure in the inflatable harness, and thus the comfort of the harness, by access to a crew control knob or lever on the side of the demand regulator assembly. The demand regulator assembly also provides for a means to provide purging air to the inside of the lens assembly via suitably arranged passages in the mask.

A second presently preferred embodiment addresses the desirable benefits, for cost, reliability and manufactureability reasons, to manufacture the mask as a single piece lens and face seal assembly out of transparent silicone of the type suitable for use as a flexible lens material. It has been found that such a configuration further simplifies the design of the mask by eliminating the manufacturing step of sealing the lens with the balance of the face seal, and avoiding irregularities in flexibility associated with discontinuities between materials and the transition between the lens and the face seal. Similarly to the previously described embodiments, the forward lower portion of the face seal is molded to accommodate the demand flow regulator and the attach points of the inflatable harness straps to provide a complete assembly. In this alternative method of construction, the area of the mold representing the lens is finished to a sufficiently high optical accuracy for the intended purpose and the mold is configured to provide appropriate thickness to the lens area in comparison to the balance of the mask. Then, an optical quality clear silicone is used to mold the mask and to thus provide an integrally formed mask and lens assembly. In a presently preferred embodiment, a General Electric Silicone known as 454-3243 Ultra Tufel "Water Clear, Fast Cure can be used to mold such a mask and provide acceptable clarity, flexibility, strengths and damage resistance capabilities.

From the forgoing, it will be appreciated that the crew emergency mask assembly of the present invention allows for a substantially improved field of view and stowability while still providing a comfortable and highly effective mask for use in hazardous circumstances in the flight deck of a high performance aircraft.

While several forms of the invention have been illustrated and described, it will also be apparent that various modifications can be made without departing from the spirit and scope of the invention. Accordingly, it is not intended that the invention be limited except as by the appended claims.

We claim:

1. In a quick-donning full face oxygen mask for use in oxygen depleted environments or environments contaminated by smoke or other pollutants, the full face oxygen mask including a flexible mask assembly having a flexible periphery conformable to a wearer's face, the improvement in the quick-donning full face oxygen mask comprising:
    a flexible optical lens of optical quality disposed in said flexible mask assembly, said flexible optical lens having a rolled configuration for storage and an unrolled configuration capable of deflecting to conform to a wearer's face and to said rolled configuration.

2. The quick-donning full face oxygen mask of claim 1, wherein said flexible optical lens is formed of clear silicone.

3. The quick-donning full face oxygen mask of claim 1, wherein said flexible optical lens is coated with a scratch resistant additive.

4. The quick-donning full face oxygen mask of claim 3, wherein said flexible optical lens is coated with a scratch resistant coating of clear urethane.

5. The quick-donning full face oxygen mask of claim 1, wherein said flexible optical lens is formed of a clear peroxide cured molding grade silicone.

6. The quick-donning full face oxygen mask of claim 1, wherein said flexible mask assembly is formed of a flexible, optically transparent plastic.

7. The quick-donning full face oxygen mask of claim 1, wherein said flexible mask assembly is formed of a flexible, optically transparent silicone.

8. The quick-donning full face oxygen mask of claim 1, wherein said flexible mask assembly comprises a face seal formed of silicone.

9. The quick-donning full face oxygen mask of claim 1, wherein said flexible mask assembly comprises an inflatable harness formed of silicone tubing.

10. The quick-donning full face oxygen mask of claim 1, wherein said flexible mask assembly and said flexible optical lens are formed as a single piece of transparent silicone.

11. The quick-donning full face oxygen mask of claim 10, wherein said flexible mask assembly and said flexible optical lens are formed of an optical quality clear silicone.

12. The quick-donning full face oxygen mask of claim 11, wherein said flexible optical quality lens is coated with an abrasion resistant material.

13. The quick-donning full face oxygen mask of claim 1, wherein said flexible optical quality lens provides a wide field of view to the wearer.

* * * * *